US009286094B2

(12) United States Patent
Philipson et al.

(10) Patent No.: US 9,286,094 B2
(45) Date of Patent: Mar. 15, 2016

(54) HUMAN INTERFACE DEVICE VIRTUALIZATION USING PARAVIRTUAL USB SYSTEM

(71) Applicant: Citrix Systems, Inc., Fort Lauderdale, FL (US)

(72) Inventors: Ross Philipson, Bedford, MA (US); Jennifer Herbert, Milton (GB); Jean-Edouard Lejosne, Somerville, MA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 190 days.

(21) Appl. No.: 14/037,855

(22) Filed: Sep. 26, 2013

(65) Prior Publication Data

US 2014/0109091 A1 Apr. 17, 2014

Related U.S. Application Data

(60) Provisional application No. 61/712,833, filed on Oct. 12, 2012, provisional application No. 61/839,074, filed on Jun. 25, 2013.

(51) Int. Cl.
*G06F 9/455* (2006.01)
*G06F 9/44* (2006.01)

(52) U.S. Cl.
CPC .......... *G06F 9/45533* (2013.01); *G06F 9/4445* (2013.01); *G06F 9/45558* (2013.01); *G06F 2009/45579* (2013.01)

(58) Field of Classification Search
None
See application file for complete search history.

(56) References Cited

U.S. PATENT DOCUMENTS

| 8,327,137 | B1 * | 12/2012 | Erb | G06F 21/53 713/164 |
| 2007/0300223 | A1 * | 12/2007 | Liu | G06F 9/5077 718/1 |
| 2009/0150909 | A1 * | 6/2009 | Barreto et al. | 719/324 |
| 2010/0217916 | A1 * | 8/2010 | Gao | G06F 12/109 711/6 |
| 2011/0145820 | A1 * | 6/2011 | Pratt et al. | 718/1 |
| 2012/0013547 | A1 * | 1/2012 | Tsirkin et al. | 345/173 |

OTHER PUBLICATIONS

Xue Haifeng, XEN Virtual Machine Technology and Its Security Analysis, Wu han University Journal of Natural Sciences vol. 12 No. 1 2007, p. 159-162.*
Jan. 14, 2014 Internatinoal Search Report issued in Intenrational Application No. PCT/US2013/064083.

(Continued)

*Primary Examiner* — Abdullah Al Kawsar
(74) *Attorney, Agent, or Firm* — Banner & Witcoff, Ltd.

(57) ABSTRACT

Methods and systems for performing device virtualization are described herein. Hardware devices may be virtualized for use by multiple operating system instances executing on a single device. The device may be virtualized by detecting input at the device, notifying a control domain of the input, the control domain determining a virtual machine (e.g., a guest domain) for which the input is intended, and passing the input from the control domain to the guest domain. There may be multiple guest domains on the device, each capable of receiving input from the hardware being virtualized. The virtualized hardware may include, e.g., a digitizer such as a touch digitizer capable of recognizing multiple concurrent inputs. Other hardware devices can also be virtualized. Virtualization may be performed using device emulation in the control domain, or using USB passthrough, among other techniques.

13 Claims, 6 Drawing Sheets

(56) References Cited

OTHER PUBLICATIONS

Sarfraz Nawaz Brohi et al: 11 Exploit of 1-20, Open Source Hypervisors for Managing the Virtual Machines on Cloud 11, International Journal of Advanced Engineering Sciences and Technologies, Jul. 15, 2011 pp. 55-60, XP055094601, Retrieved from the Internet: URL:academia.edu/4877225/Exploit of Open Source Hypervisors for Managing the Virtual Mach1nes on Cloud—retrieved—on Dec. 20, 2013] Section II. A. XEN Hypervisor, Fig. 4-5;B. KVM Hypervisor, Fig. 8; p. 59, left column, 2nd paragraph.

Muli Ben-Yehuda et al: "The Xen Hypervisor and its IO Subsystem virtualizing a machine near you", Dec. 11, 2005, pp. 1-40, XP055094540, Retrieved from the Internet: URL:mulix.org/lectures/xen-iommu/xen-io.pdf [retrieved on Dec. 20, 2013] The Xen Hypervisor on slides 7-10; Xen IO on slides 11-16.

Noboru Iwamatsu: "Copyright 2008 Fujitsu Limited Paravirtualized USB Support for Xen", Jan. 1, 2008, pp. 1-12, XP055093759, Retrieved from the Internet: URLxen.xensource.com/files/xensummit_tokyo/26_NoboruIwamatsu-en.pdf [retrieved on Dec. 16, 2013] Slides 3, 5, 8.

* cited by examiner

HUMAN INTERFACE DEVICE VIRTUALIZATION USING PARAVIRTUAL USB SYSTEM

CROSS-REFERENCE TO RELATED CASES

This application claims priority to U.S. provisional application No. 61/712,833, filed Oct. 12, 2012, entitled "Virtualization of Input Devices," and to U.S. provisional application No. 61/839,074, filed Jun. 25, 2013, entitled "Virtualization of Devices using USB Passthrough," each of which is herein incorporated by reference in its entirety for all purposes.

FIELD

The methods and systems described herein relate generally to software virtualization and virtual machines. More particularly, the methods and systems relate to virtualization of input devices, such as multitouch devices, and virtualization software used with tablets and other input devices.

BACKGROUND

In present virtualization environments, multi-touch and gesture-based inputs (referred to collectively as multitouch inputs) cannot be passed through from actual hardware to a virtualized environment. Rather, multitouch inputs can only be processed by the physical device with which a user is actually interacting. Other input devices also presently cannot be efficiently virtualized.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, the present invention is directed to virtualization of input devices, including multitouch devices, keyboards, mice, and other types of input devices.

According to an aspect, a hardware device may be virtualized and used by one or more virtual instances of a computing device, by detecting an input received at a human interface device, notifying a control domain of the input, determining by the control domain a guest domain/virtual machine for which the input is intended, and passing the input from the control domain to the guest domain/virtual machine. In some embodiments the guest domain/virtual machine is one of multiple guest domains/virtual machines to which the control domain is capable of passing the input. In some embodiments the human interface device is a multi-input touch digitizer.

In some embodiments, the notifying may further include hypervisor receiving an input interrupt, and passing the input interrupt to the virtual machine or guest domain. In some embodiments, the determining may include the control domain generating one or more HID-compliant events and making the one or more HID-compliant events available to a user mode of the control domain. The control domain may route the HID-compliant events to an emulator, e.g., a QEMU, associated with the guest domain/virtual machine, and the emulator may create a virtual input device on a virtual PCI bus associated with the guest domain/virtual machine. The passing may further include generating a virtual hardware interrupt by the emulator, routing the virtual hardware interrupt to an input device driver on the guest domain/virtual machine, and reading, by the guest domain/virtual machine and responsive to the virtual hardware interrupt, the one or more HID-compliant events from the virtual input device on the virtual PCI bus associated with the guest domain/virtual machine.

In other embodiments, the passing may include exposing, at the control domain, a virtualization of the digital device using a paravirtual USB system. The exposing may include generating, within the control domain, a separate virtual device corresponding to each additional guest domain/virtual machine instantiated on a same host device as the control domain. Then, an operating system of the guest domain/virtual machine may recognize its corresponding virtual device as a HID-compliant device using a paravirtual USB driver installed on the guest domain/virtual machine, and the operating system may drive the virtual device as the HID-compliant device using an operating system HID driver operative with HID-compliant devices.

The details of various embodiments of the invention are set forth in the accompanying drawings and the description below.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1:
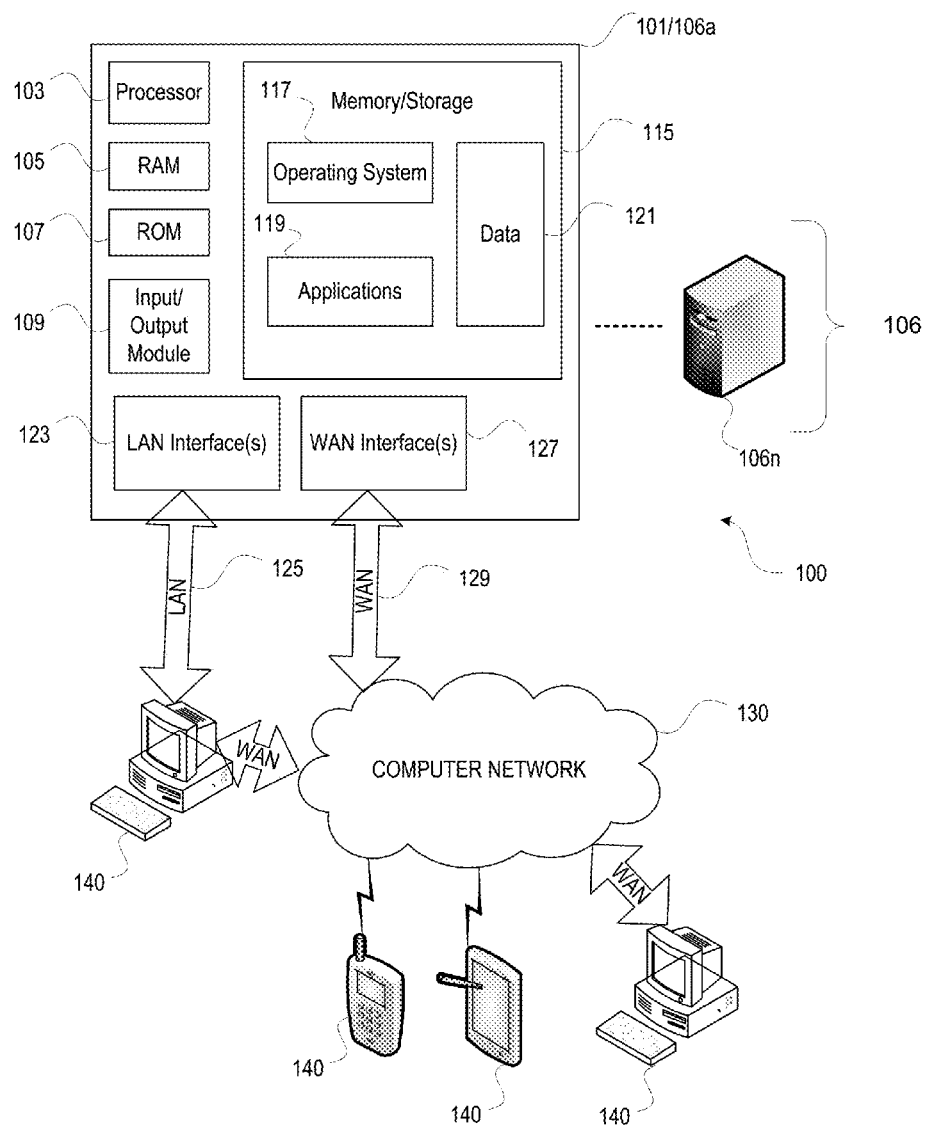
FIG. 1 illustrates a network environment that may be used according to one or more illustrative aspects described herein.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In the following description of the various embodiments, reference is made to the accompanying drawings, which form a part hereof, and in which is shown by way of illustration various embodiments in which aspects may be practiced. It is to be understood that other embodiments may be utilized and structural and functional modifications may be made without departing from the scope described herein. Aspects are capable of other embodiments and of being practiced or being carried out in various ways. The provisioning of specific hardware and software examples is provided for illustrative purposes only, and is not meant to be limiting in any respect. Indeed, additional and/or newer hardware or software may also be used with features and aspects described herein.

Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems including a virtualization environment which may be useful for practicing embodiments described herein; and Section C describes embodiments of systems and methods for virtualizing multitouch inputs.

A. Network and Computing Environment

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

With reference to FIG. 1, one or more aspects described herein may be implemented in a remote-access environment. FIG. 1 depicts an example system architecture including a generic computing device 101 in an illustrative computing environment 100 that may be used according to one or more illustrative aspects described herein. Generic computing device 101 may be used as a server 106a in a single-server or multi-server desktop virtualization system (e.g., a remote access or cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory/storage 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for configuring generic computing device 101 into a special purpose computing device in order to perform various functions as described herein. For example, memory 115 may store software used by the computing device 101, such as an operating system 117, application programs 119, and an associated database 121.

Computing device 101 may operate in a networked environment supporting connections to one or more remote computers, such as terminals 140 (also referred to as client devices). The terminals 140 may be personal computers, mobile devices, laptop computers, tablets, or servers that include many or all of the elements described above with respect to the generic computing device 103 or 101. The network connections depicted in FIG. 1 include a local area network (LAN) 125 and a wide area network (WAN) 129, but may also include other networks. When used in a LAN networking environment, computing device 101 may be connected to the LAN 125 through a network interface or adapter 123. When used in a WAN networking environment, computing device 101 may include a modem 127 or other wide area network interface for establishing communications over the WAN 129, such as computer network 130 (e.g., the Internet). It will be appreciated that the network connections shown are illustrative and other means of establishing a communications link between the computers may be used. Computing device 101 and/or terminals 140 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 may include a network appliance installed between the server(s) 106 and client machine(s) 140. The network appliance may manage client/server connections, and in some cases can load balance client connections amongst a plurality of backend servers 106.

The client machine(s) 140 may in some embodiments be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following non-exhaustive terms: client machine(s); client(s); client computer(s); client device (s); client computing device(s); local machine; remote machine; client node(s); endpoint(s); or endpoint node(s). The server 106, in some embodiments, may be referenced by any one of the following non-exhaustive terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

Some embodiments include a client device 140 that displays application output generated by an application remotely executing on a server 106 or other remotely located machine. In these embodiments, the client device 140 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, uses a remote presentation protocol or other program to send data to a thin-client or remote-display application executing on the client to present display output generated by an application executing on the server 106. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 106A-106n such that the servers 106a-106n are logically grouped together into a server farm 106, for example, in a cloud computing environment. The server farm 106 may include servers 106 that are geographically dispersed while and logically grouped together, or servers 106 that are located proximate to each other while logically grouped together. Geographically dispersed servers 106a-106n within a server farm 106 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms.

In some embodiments, a server farm may include servers 106 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 106 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 140, forwards the request to a second server 106b, and responds to the request generated by the client machine 140 with a response from the second server 106b. First server 106a may acquire an enumeration of applications available to the client machine 140 and well as address information associated with an application server 106 hosting an application identified within the enumeration of applications. First server 106a can then present a response to the client's request using a web interface, and communicate directly with the client 140 to provide the client 140 with access to an identified application. One or more clients 140 and/or one or more servers 106 may transmit data over network 130, e.g., network 101.

B. Virtualization Environment

Figure 2:
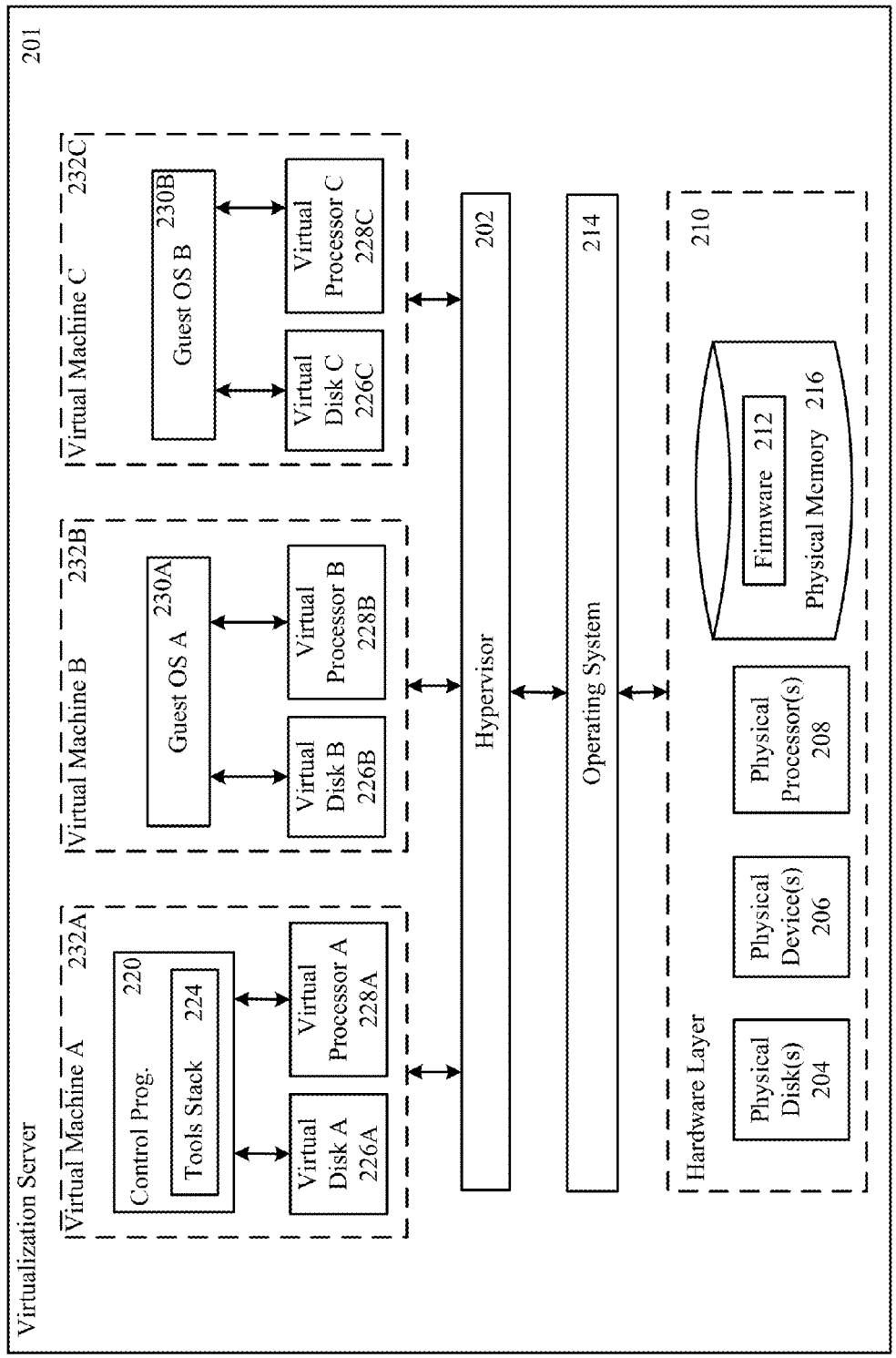
FIG. 2 illustrates a device architecture that may be used according to one or more illustrative aspects described herein.

FIG. 2 shows a high-level architecture of an illustrative desktop virtualization system. As shown, the desktop virtualization system may be single-server or multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

With further reference to FIG. 2, a computer device 201 may be configured as a virtualization server in a virtualization environment, for example, a single-server, multi-server, or cloud computing environment. Virtualization server 201 illustrated in FIG. 2 can be deployed as and/or implemented by one or more embodiments of the server 106 illustrated in FIG. 2 or by other known computing devices. Included in virtualization server 201 is a hardware layer that can include one or more physical disks 204, one or more physical devices 206, one or more physical processors 208 and one or more physical memories 216. In some embodiments, firmware 212 can be stored within a memory element in the physical memory 216 and can be executed by one or more of the physical processors 208. Virtualization server 201 may further include an operating system 214 that may be stored in a memory element in the physical memory 216 and executed by one or more of the physical processors 208. Still further, a hypervisor 202 may be stored in a memory element in the physical memory 216 and can be executed by one or more of the physical processors 208.

Executing on one or more of the physical processors 208 may be one or more virtual machines 232A-C (generally 232). Each virtual machine 232 may have a virtual disk 226A-C and a virtual processor 228A-C. In some embodiments, a first virtual machine 232A may execute, using a virtual processor 228a, a control program 220 that includes a tools stack 224. Control program 220 may be referred to as a control domain, e.g., including but not limited to dom0 (or Dom0), Domain 0, a service virtual machine, or other system used for administration and/or control. In some embodiments, one or more virtual machines 232B-C can execute, using a virtual processor 228B-C, a guest operating system 230A-B.

Virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 116. Physical components 204, 206, 208, and 216 may include, for example, any of the components described above. Physical devices 206 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 201. Physical memory 216 in the hardware layer 210 may include any type of memory. Physical memory 216 may store data, and in some embodiments may store one or more programs, or set of executable instructions. FIG. 2 illustrates an embodiment where firmware 212 is stored within the physical memory 216 of virtualization server 201. Programs or executable instructions stored in the physical memory 216 can be executed by the one or more processors 208 of virtualization server 201.

Virtualization server 201 may also include a hypervisor 202. In some embodiments, hypervisor 202 may be a program executed by processors 208 on virtualization server 201 to create and manage any number of virtual machines 232. Hypervisor 202 may be referred to as a virtual machine monitor, or platform virtualization software. In some embodiments, hypervisor 202 can be any combination of executable instructions and hardware that monitors virtual machines executing on a computing machine. Hypervisor 202 may be Type 2 hypervisor, where the hypervisor that executes within an operating system 214 executing on the virtualization server 201. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 101 in a virtualization environment may instead include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, as shown, a Type 1 hypervisor may directly access all system resources without the host operating system 214. A Type 1 hypervisor may execute directly on one or more physical processors 208 of virtualization server 201, and may include program data stored in the physical memory 316.

Hypervisor 202, in some embodiments, can provide virtual resources to operating systems 230 or control programs 220 executing on virtual machines 232 in any manner that simulates the operating systems 230 or control programs 220 having direct access to system resources. System resources can include, but are not limited to, physical devices 206, physical disks 204, physical processors 208, physical memory 216 and any other component included in virtualization server 201 hardware layer 210. Hypervisor 202 may be used to emulate virtual hardware, partition physical hardware, virtualize physical hardware, and/or execute virtual machines that provide access to computing environments. In still other embodiments, hypervisor 202 controls processor scheduling and memory partitioning for a virtual machine 232 executing on virtualization server 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 201 executes a hypervisor 202 that creates a virtual machine platform on which guest operating systems may execute. In these embodiments, the virtualization server 201 may be referred to as a host server. An example of such a virtualization server is the XEN SERVER provided by Citrix Systems, Inc., of Fort Lauderdale, Fla.

Hypervisor 202 may create one or more virtual machines 332B-C (generally 232) in which guest operating systems 230 execute. In some embodiments, hypervisor 202 may load a virtual machine image to create a virtual machine 232. In other embodiments, the hypervisor 202 may executes a guest operating system 230 within virtual machine 232. In still other embodiments, virtual machine 232 may execute guest operating system 230.

In addition to creating virtual machines 232, hypervisor 202 may control the execution of at least one virtual machine 232. In other embodiments, hypervisor 202 may presents at least one virtual machine 232 with an abstraction of at least one hardware resource provided by the virtualization server 201 (e.g., any hardware resource available within the hardware layer 210). In other embodiments, hypervisor 202 may control the manner in which virtual machines 232 access physical processors 208 available in virtualization server 201. Controlling access to physical processors 208 may include determining whether a virtual machine 232 should have access to a processor 208, and how physical processor capabilities are presented to the virtual machine 232.

As shown in FIG. 2, virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments virtualization server 201 can host any number of virtual machines 232. Hypervisor 202, in some embodiments, provides each virtual machine 232 with a unique virtual view of the physical hardware, memory, processor and other system resources available to that virtual machine 232. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, hypervisor 202 may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided and managed by the hypervisor 202. In some embodiments, hypervisor 202 provides each virtual machine 232 with a unique view of the physical disks 204. Thus, in these embodiments, the particular virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided and managed by hypervisor 202. In some embodiments, virtual processor 228 has substantially all of the same characteristics of at least one physical processor 208. In other embodiments, virtual processor 208 provides a modified view of physical processors 208 such that at least some of the characteristics of the virtual processor 228 are different than the characteristics of the corresponding physical processor 208.

C. Multitouch Virtualization

Each client device 101, 140 may be any type of computing device, including laptop computers, desktop computers, portable computers, mobile computers, smartphones, tablets, e-readers, and the like. In some embodiments described below, client device 140 has multitouch input capabilities, as applicable. As used herein, multitouch refers to the ability to recognize gestures (even if made with a mouse, as opposed to physical touch), where a device recognizes a continuous motion of cursor or touch-based input, and also refers to the ability to recognize and respond to multi-point input, where a digitizer or other touch-like input recognizer detects and responds to two or more concurrent inputs provided at two or more different locations on a display screen.

Figure 3:
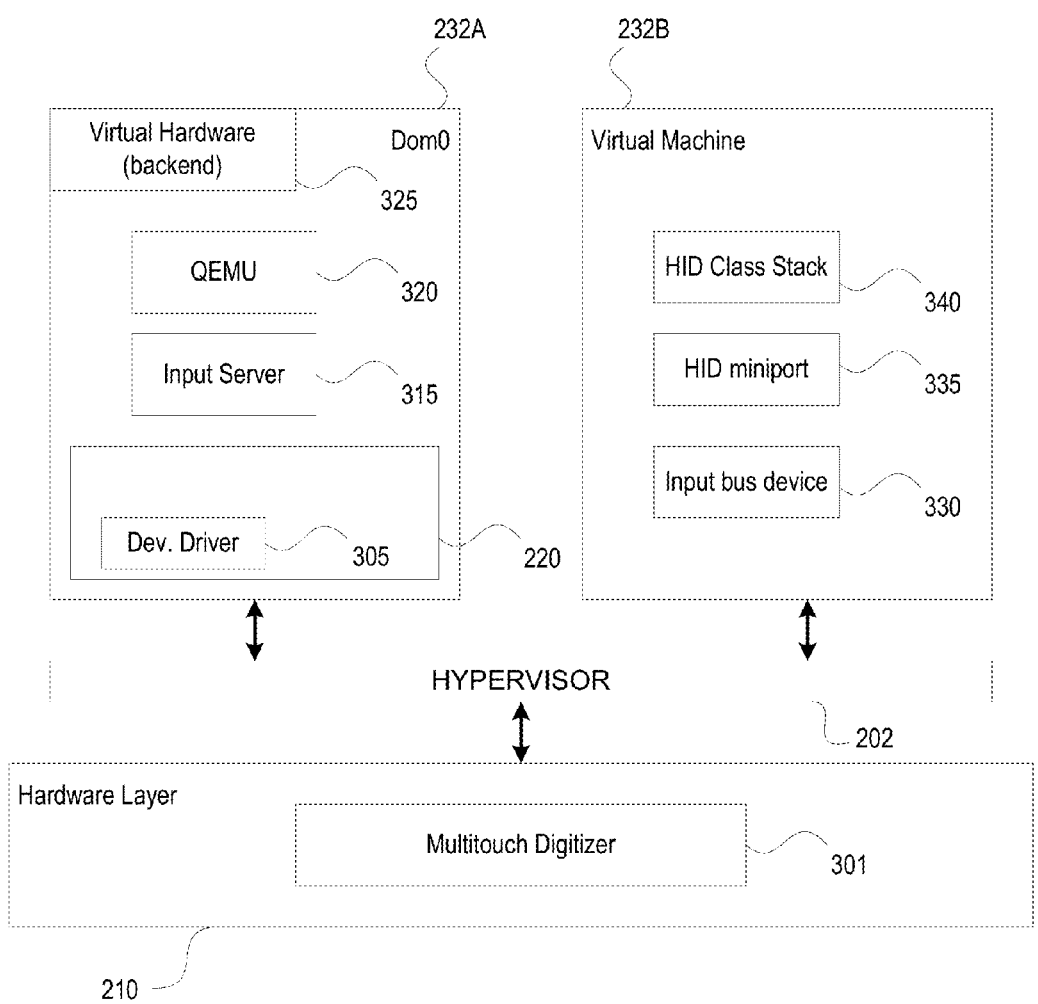
FIG. 3 illustrates a system architecture that may be used with one or more illustrative aspects described herein.

FIG. 3 illustrates a system architecture that may be used to perform virtualization of multitouch input as described herein. FIG. 3 illustrates hardware layer 210, control virtual machine 232A, and guest virtual machine 232B from FIG. 2B, with further features as may be used herein. As shown in FIG. 3, hardware layer 210 may include a multitouch digitizer 301, which may or may not be a USB device. In the example illustrated in FIG. 3, virtualization may be performed within a single device, e.g., device 201 using a type 1 hypervisor. Virtual machines (VMs) 232A and 232B execute on top of a type 1 hypervisor 202. A type 2 hypervisor may alternatively be used. Virtual machine 232A may include operating system or control program 220 (e.g., a Linux kernel), which further includes a device driver 305, e.g., a human interface device (HID) driver or a legacy input device driver. Device driver 305 may or may not be a USB device driver, based on digitizer 301. VM 232A may further include an input server 315 that manages touch input events (e.g., based on which VM currently has focus), emulator (QEMU) 320 that performs virtual hardware emulations, and may expose emulated virtual hardware 325 for visibility by other virtual machines. Emulator 320 exposes virtual hardware device 325 that appears to be actual hardware to guest virtual machines, such as virtual machine 232B. Virtual machine 232B may then include a bus driver 330, HID miniport 335, and HID class stack 340 (e.g., a WINDOWS HID class stack). Bus driver 330 may be a virtual hardware bus driver that exposes one or more HID child devices to an operating system executing on virtual machine 232B. HID miniport 335 allows child devices on bus 330 to interface with HID class stack 340 HID class stack 340 allows HID devices to interact with an operating system on virtual machine 232B. HID Class Stack 340 may be provided as part of an operating system, e.g., WINDOWS® by Microsoft Corporation of Redmond, Wash.

The operating system on VM 232B may thereafter interact with virtual device 325 via the virtual drivers, where virtual device 325 provides or mirrors input received from digitizer 301. Virtual machines 232A, 232B may appear to communicate directly with each other. In some aspects, however, communication between virtual machines 232A and 232B may be passed through or routed by the hypervisor.

Figure 4:
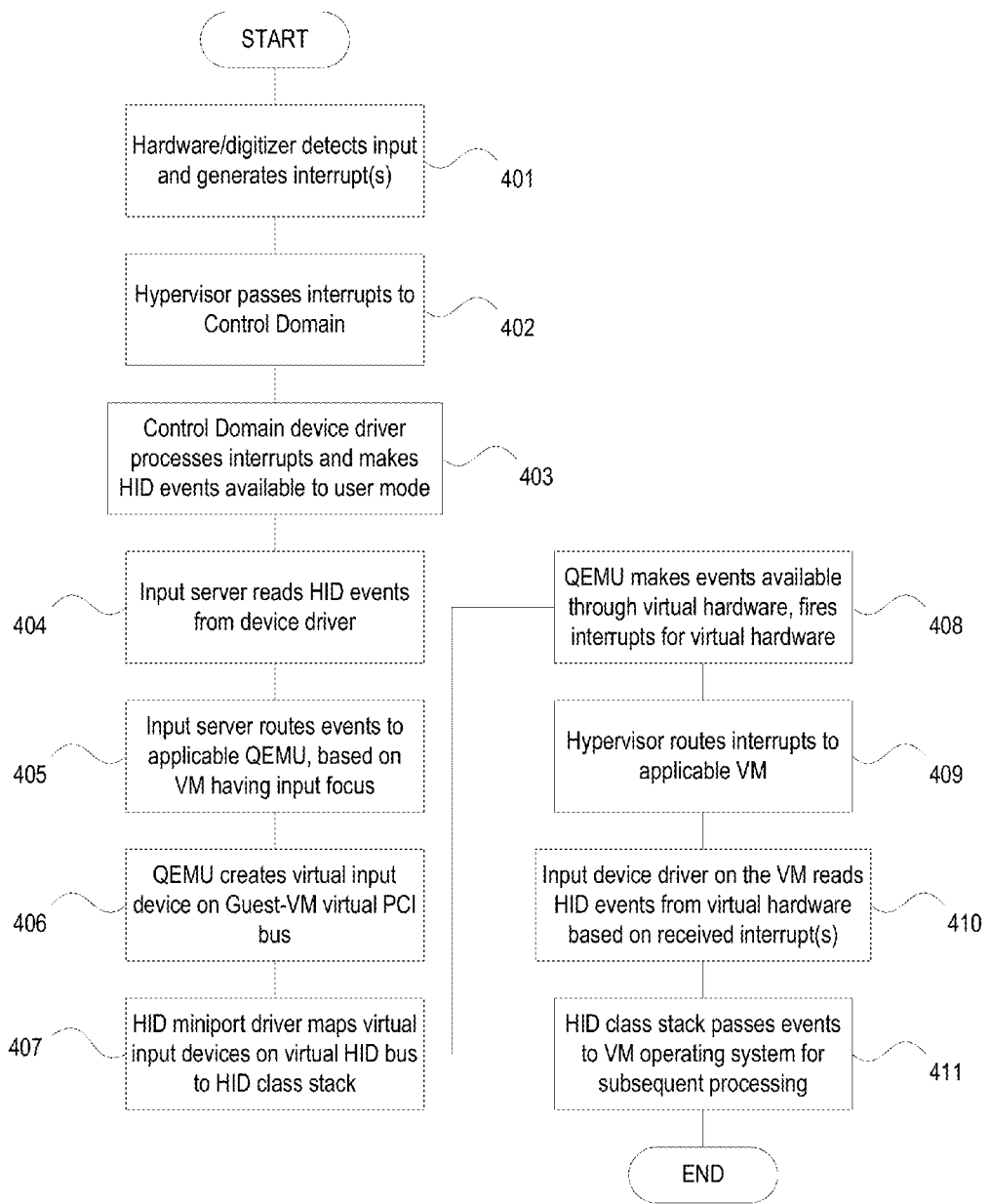
FIG. 4 illustrates a method for virtualizing multitouch input according to one or more illustrative aspects described herein.

FIG. 4 illustrates a method of virtualizing multitouch input using one or more of the systems described above. Virtualization of multitouch input is useful, e.g., to allow an operating system executing on a virtual machine to benefit from and make use of multitouch input received via a digitizer or other multitouch input device. Using the method described in FIG. 4, or a variation thereof, a system can consume (service and clear) an initial digitizer interrupt in a control virtual machine, and generate a new interrupt for a guest virtual machine based on virtual hardware emulated by the control virtual machine.

Initially, in step 401, a physical hardware digitizer 301 (or other multitouch sensor) detects direct input from a user, e.g., using a stylus, finger, etc. Responsive to the input, the hardware digitizer 301 generates one or more interrupts based on the input.

In step 402, the client device 102 receives the interrupts, e.g., the hypervisor routes the interrupts to driver 305 executing on a control domain, also referred to as dom0 in some embodiments. Driver 305 receives the interrupts and determines the input location, coordinates, vector, pressure, etc. Client device 102 may use the USB Device Class Definition for Human Interface Devices, firmware specification, published by USB Implementers Forum, Inc., of Beaverton, Oreg.

In step 403, device driver 305 makes HID events available to a user mode in dom0 (control VM 232A), e.g., by presenting a device node from which events can be consumed by input server 315 (also known as an input manager, input daemon, and/or input management daemon). In step 404, input server 315 reads the HID events from driver 305. The input server, executing in dom0, is aware of which VM running on device 102 has focus when the input was received, e.g., where multiple guest VMs are executing at the same time. In step 405, the input server routes the HID events to emulator (QEMU) 320 based on which VM has input focus (input focus may or may not correspond to a VM having visual focus). That is, because there may be one QEMU in dom0 per guest virtual machine, the input server 315 routes the HID to the QEMU emulating the virtual environment for the guest VM that had input focus when the digitizer input was detected (e.g., when the first interrupt was fired). In an alternative aspect, QEMU 320 may execute in a stub domain, and/or there may be one QEMU per emulated device, or based on some other variable, rather than one QEMU per domain.

In step 406, the QEMU creates a virtual input backend device 325 and virtual input frontend device. The frontend device may appears as a virtual input bus device 330 on the guest domain's (e.g., 232B) virtual PCI bus. As used herein, a guest domain refers to any other domain on the device other than the control domain, and may include a virtual machine or any other type of guest domain. The input bus device 330 receives interrupts from the backend device 325. QEMU sends a configuration interrupt from backend device 325 to frontend device 330 instructing the frontend device to create a new HID device on the virtual input bus of the guest domain. In step 407, the Guest Domain, after creating the new HID device, connects or attaches the new HID device to the HID miniport driver 335 and to the HID class stack 340.

In step 408, dom0 generates new interrupts for the virtual hardware device 325 based on the HID events. In step 409 the dom0 generated interrupts are routed to the virtual machine that had input focus when the HID events were spawned which, in this example, is VM 232B. The new interrupts may be routed to VM 232B via the hypervisor. In step 410 input bus device 330 (e.g., as driven by the XEN para-virtual input bus driver by Citrix Systems, Inc. of Ft. Lauderdale, Fla.) in VM 232B receives the interrupts from virtual hardware 325 and obtains (reads) the HID event(s). The virtual input bus device routes the individual HID events to the appropriate HID device that was created on the virtual input bus in step 406. In step 411 the HID events are passed from the HID device to the HID miniport and HID class stack based on the connections created in step 407. HID class stack 340 then passes the HID events to the operating system executing within VM 232B.

Alternatives may be used to implement aspects in non-WINDOWS based environments. For example, in a Linux or Android implementation, the input bus device may be connected to the core OS input system via a newly created device driver without using a HID framework.

Figure 5:
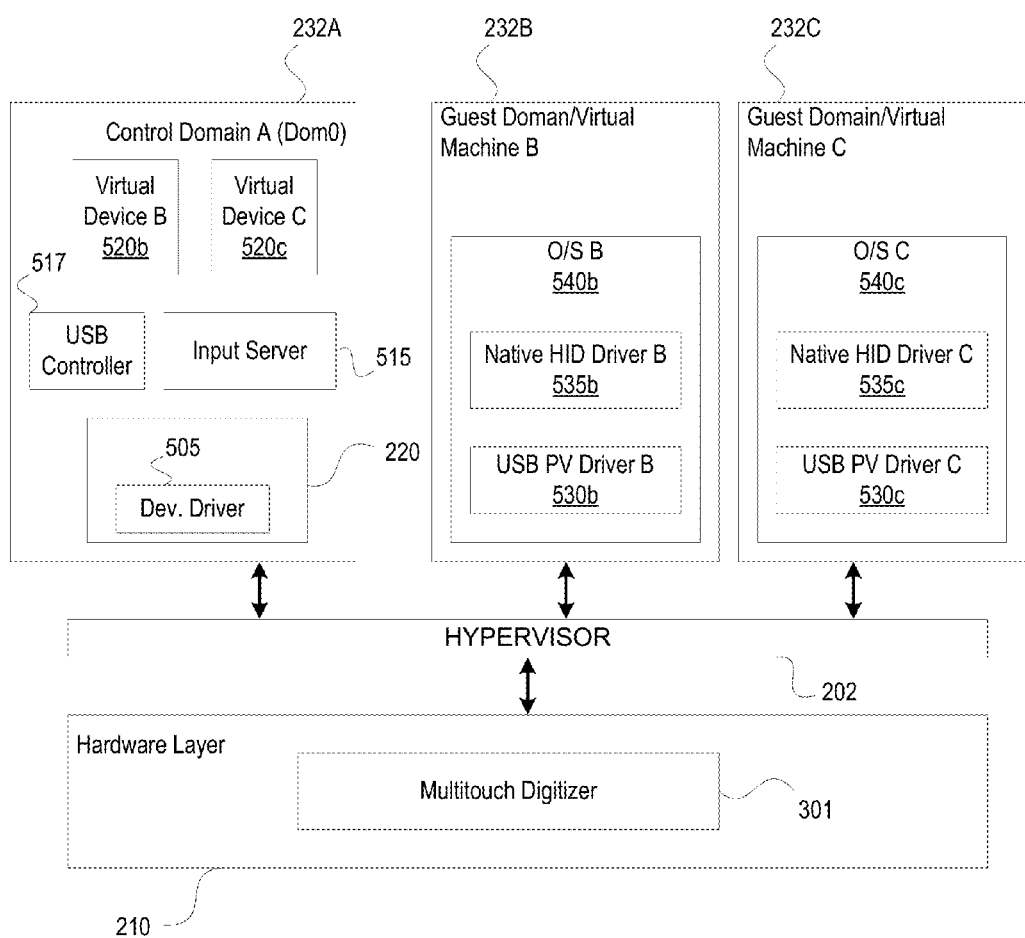
FIG. 5 illustrates an alternative system architecture that may be used with one or more illustrative aspects described herein.

With reference to FIG. 5, according to another aspect an alternative solution may be used when appropriate APIs are not present in an operating system to perform the method of FIG. 4, e.g., for use with a WINDOWS® 8 guest domain. FIG. 5 illustrates a system architecture that may be used to give multiple guests access (e.g., indirect access) to a physical digitizer or other HID-compliant device.

According to this aspect, virtualization may be implemented in the control domain (dom0), which may expose the resulting virtual USB devices to each guest domain. According to some aspects, the exposed virtual devices are HID-compliant, so that each guest domain may drive the virtual device using a HID driver for the operating system already installed on that guest domain. By exposing each device at the control domain using a paravirtual (PV) USB system, the OS-specific driver of FIG. 3 (element 330) is not needed. The operating system of each guest domain sees the device directly as an HID-compliant device using an already installed PV USB driver 530b, 530c, as shown in FIG. 5.

FIG. 5 illustrates hardware layer 210, control virtual machine 232A, and guest virtual machines 232B and 232C. As shown in FIG. 5, hardware layer 210 may include a multitouch digitizer 301, which may or may not be a USB device (e.g., it may be a serial device or any other type of device supported by a driver in dom0). In the example illustrated in FIG. 5, virtualization may be performed within a single device, e.g., device 201 using a type 1 hypervisor as shown in FIG. 2. Virtual machines (VMs) 232A, 232B, and 232C may execute on top of a type 1 hypervisor 202. A type 2 hypervisor may alternatively be used. Virtual Machine A (232A), also referred to as dom0, may include operating system or control program 220 (e.g., a Linux kernel), which further includes a device driver 505, e.g., a human interface device (HID) driver or a legacy input device driver that converts input from device 301 to a format understood by operating system 220. Device driver 505 may or may not be a USB device driver, based on digitizer 301.

VM 232A may further include an input server 515 that reads all the input devices and dispatches the events to the appropriate recipients (e.g., to guest domains), as described herein. The input server manages input events (e.g., based on which VM currently has focus), and passes input to a corresponding virtual USB device 520b, 520c based on the desired guest domain to which the input is to be sent. Virtual devices 520b, 520c are each a virtual device created in dom0, e.g., using the "gadget" API in Linux, and under the control of USB Controller 517. USB controller 517 may be a physical controller, or may be a virtual gadget-compatible USB controller optionally adapted to be a multi-port and/or timer-independent such that user input is performed in real-time. In one embodiment, it is virtual, in order to ensure gadget-compatibility. Each device 520 is created as an extension of the existing HID gadget, and adheres to HID over USB standards and specifications.

Each guest domain 232B, 232C uses an operating system 540b, 540c, respectively, e.g., Windows, Linux, etc. In this illustrative example the operating system may be WINDOWS® 8 by Microsoft Corporation of Redmond, Wash. Each guest domain 232B, 232C includes a HID driver 535b, 535c native to its respective operating system 540b, 540c. Each HID driver 535 may use the HID over USB standards. Each virtual USB digitizer 520 also follows the HID over USB specifications, so that any proper HID driver is able to drive the virtual device 520. Each guest domain 232B, 232C may also include a PV USB Driver 530b, 530c, which is an operating system-specific driver that facilitates USB passthrough by communicating with dom0 to gain access to its correspondingly assigned USB device 520b, 520c, and passes the input events to corresponding driver 535 in the same guest domain. Each driver 530, provided by Citrix Systems, Inc. of Fort Lauderdale, Fla., repetitively polls dom0 to determine when there are USB input events intended for the driver's guest domain, and retrieves those events for use within the guest domain. The operating system on VM 232B, 232C may thereafter interact with its corresponding virtual USB device 520b, 520c using driver 530.

Figure 6:
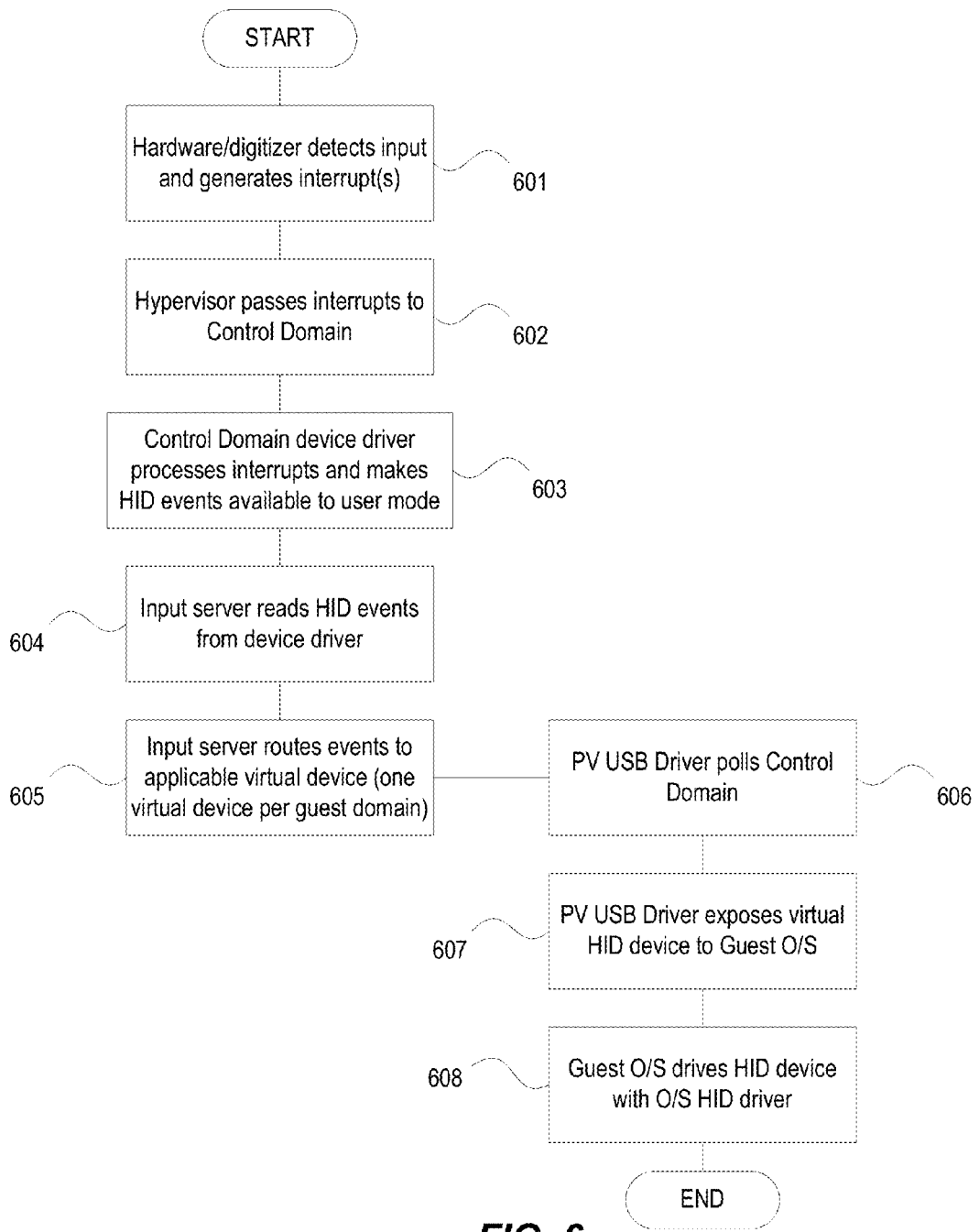
FIG. 6 illustrates a method for virtualizing multitouch input according to one or more illustrative aspects described herein.

FIG. 6 illustrates a method of operation using the system architecture of FIG. 5. Prior to the start of the method illustrated in FIG. 6, the control domain 232A creates a unique virtual device 520b, 520c for each instantiated guest domain, under the control of USB controller 517. Whenever user input is provided to a physical device, e.g., to digitizer 301, then in step 601 the device detects the input (or other event) and generates one or more interrupts based on the detected input.

In step 602, the hypervisor passes the interrupt(s) to the control domain (dom0).

In step 603, the control domain device driver 505 processes the interrupts and makes HID events available to a user mode of operating system 220.

In step 604 the input server 515 reads an HID event from device driver 505, and determines the guest domain to which the input should be routed, e.g., based on which guest domain has input focus.

In step 605 input server 515 sends the input event to the appropriate virtual device 520a, 520b for the guest domain for which the input is intended.

In step 606, the PV USB driver 530 of the guest domain for which the input is intended sees the input event as being available on its corresponding Virtual USB device 520, based on driver 530 continuously polling dom0 for USB events. Driver 530 then pulls the input event from dom0.

In step 607 driver 530 exposes the virtual HID device to guest O/S 540.

In step 608, guest 0/S 540 drives virtual HID device 520 using O/S driver 535 based on events from PV USB driver 530.

Creating a virtual USB device in the control domain and exposing it to each guest domain using a PV USB system may be used for purposes other than input, and may replace or be used instead of a system requiring custom backend and frontend paired software modules (e.g., as shown in FIG. 3-4). That is, when such a system is used, a significant amount of work is reduced because one no longer needs to write OS-specific code to support different operating systems. Device virtualization is done once, in the control domain, in a manner generic to different operating systems.

Using aspects described above, signals from an array of input devices (which may include devices in addition to or other than multitouch input devices) may be multiplexed in a way that allows a guest virtual machine to distinguish between them and consume the input provided via each device. Aspects described herein may be used to multiplex a variety of different input devices, for which a multi-touch device is just one example. Alternative input devices that may be used include mice, keyboards, microphones, cameras, joysticks, pointing sticks, track pads, touch screens (either "mono-touch" or "milti-touch"), digitizer (e.g., graphics tablet), stylus, 3D mice, space ball, jog dial, and others.

According to some aspect described herein, signals from an array of input devices alternatively may be multiplexed such that guest domains cannot distinguish between them, to provide enhanced security. A host domain (e.g., dom0) controls the input by routing the input through an input server instead of directly linking input to a guest domain. The input server can perform analysis and heuristics on input to determine whether input should be passed to a guest domain or not. If an input event does not match a given security policy or otherwise appears malicious or illegitimate, the input server may disregard the input rather than forward the input to a guest domain.

Conclusion

Described above, among other aspects, are at least two methods for virtualizing human input. The first includes a set of guest drivers that creates a virtual input device in each guest domain and feeds the virtual input devices with events from the input management deamon running in the backend (e.g., dom0). The second one may be implemented entirely in the backend (e.g., dom0), by creating virtual USB HID devices (e.g., using the Linux gadget system) and feeding them with events from the input manager. The USB devices may then be exposed to the guests using any paravirtualized USB system, by attaching those virtual devices to a physical or virtual gadget-compatible USB controller. Other aspects, embodiments, and implementations may also be possible.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    detecting an input received at a human interface device;
    notifying a control domain of the input;
    determining, by the control domain, a guest domain for which the input is intended;
    passing the input from the control domain to the guest domain by exposing, at the control domain, a separate virtualized version of the human interface device using a paravirtual USB system for each guest domain instantiated on a same host device as the guest domain;
    recognizing, by an operating system of the determined guest domain, its corresponding virtualized version of the human interface device as a HID-compliant device using a paravirtual USB driver installed on the determined guest domain; and
    driving, by the operating system of the determined guest domain, the virtualized version of the human interface device as the HID-compliant device using an operating system HID driver operative with HID-compliant devices.

2. The method of claim 1, wherein said determined guest domain is one of multiple guest domains to which the control domain is capable of passing the input.

3. The method of claim 1, wherein the human interface device is a multi-input touch digitizer.

4. The method of claim 1, wherein said notifying further comprises a hypervisor receiving an input interrupt, and passing the input interrupt to the control domain.

5. The method of claim 1, wherein the guest domain is a virtual machine.

6. One or more non-transitory computer readable media storing computer executable instructions that, when executed by a processor, cause a system to perform device virtualization by:
    detecting an input received at a human interface device;
    notifying a control domain of the input;
    determining, by the control domain, a virtual machine for which the input is intended;
    passing the input from the control domain to the virtual machine by exposing, at the control domain, a separate virtualized version of the human interface device using a paravirtual USB system for each virtual machine instantiated on a same host device as the control domain;
    recognizing, by an operating system of the determined virtual machine, its corresponding virtualized version of the human interface device as a HID-compliant device using a paravirtual USB driver installed on the determined virtual machine; and
    driving, by the operating system of the determined virtual machine, the virtualized version of the human interface device as the HID-compliant device using an operating system HID driver operative with HID-compliant devices.

7. The computer readable media of claim 6, wherein the determined virtual machine is one of a plurality of virtual machines to which the control domain is capable of passing the input.

8. The computer readable media of claim 6, wherein the human interface device is a multi-input touch digitizer.

9. The computer readable media of claim 6, wherein said notifying further comprises a hypervisor receiving an input interrupt, and passing the input interrupt to the control domain.

10. A system, comprising:
a processor; and
memory storing computer readable instructions which, when executed by the processor, cause the system to perform:
   detecting an input received at a human interface device communicatively coupled to the system;
   notifying a control domain executing on the system of the input;
   determining, by the control domain, a guest domain for which the input is intended, wherein the guest domain executes on the system;
   passing the input from the control domain to the guest domain by exposing, at the control domain, a separate virtualized version of the human interface device using a paravirtual USB system for each guest domain executing on the system;
   recognizing, by an operating system of the determined guest domain, its corresponding virtualized version of the human interface device as a HID-compliant device using a paravirtual USB driver installed on the determined guest domain; and
   driving, by the operating system of the determined guest domain, the virtualized version of the human interface device as the HID-compliant device using an operating system HID driver operative with HID-compliant devices.

11. The system of claim 10, wherein the determined virtual machine is one of a plurality of virtual machines to which the control domain is capable of passing the input.

12. The system of claim 10, wherein the human interface device is a multi-input touch digitizer.

13. The system of claim 10, wherein said notifying further comprises a hypervisor receiving an input interrupt, and passing the input interrupt to the control domain.

* * * * *